United States Patent [19]
Gill et al.

[11] 3,931,472
[45] *Jan. 6, 1976

[54] ASYNCHRONOUS QUADRIPHASE COMMUNICATIONS SYSTEM AND METHOD

[75] Inventors: Walter J. Gill, Saratoga; James A. Mellenger, Sunnyvale, both of Calif.

[73] Assignee: Avantek, Inc., Santa Clara, Calif.

[ * ] Notice: The portion of the term of this patent subsequent to May 7, 1991, has been disclaimed.

[22] Filed: May 7, 1974

[21] Appl. No.: 467,656

Related U.S. Application Data

[63] Continuation-in-part of Ser. No. 225,823, Feb. 14, 1972, Pat. No. 3,809,817.

[52] U.S. Cl.............................. 179/15 BA; 178/67
[51] Int. Cl.² ........................................... H04J 3/06
[58] Field of Search ....... 179/15 BS, 15 BC, 15 BA, 179/1.5 S, 1.5 E, 1.5 M, 15 BT; 178/69.5 R, 67, 22; 325/32, 122

[56] References Cited
UNITED STATES PATENTS
| | | | |
|---|---|---|---|
| 3,736,507 | 5/1973 | Wolejsza | 178/67 X |
| 3,809,817 | 5/1974 | Gill | 179/15 BS |

Primary Examiner—William C. Cooper
Assistant Examiner—E. S. Kemeny
Attorney, Agent, or Firm—Limbach, Limbach & Sutton

[57] ABSTRACT

A communications system and method for transmitting and receiving two independently timed (asynchronous) binary data signals on a quadriphase carrier. The four phase ambiguity ordinarily resulting from quadriphase transmission and reception is overcome by uniquely identifying one input channel, for example, by slightly increasing the clock rate of the channel. In reception each channel is demodulated and the data rate of each channel is examined to identify the increased clock rate channel. That channel is then returned to its original clock rate.

16 Claims, 23 Drawing Figures

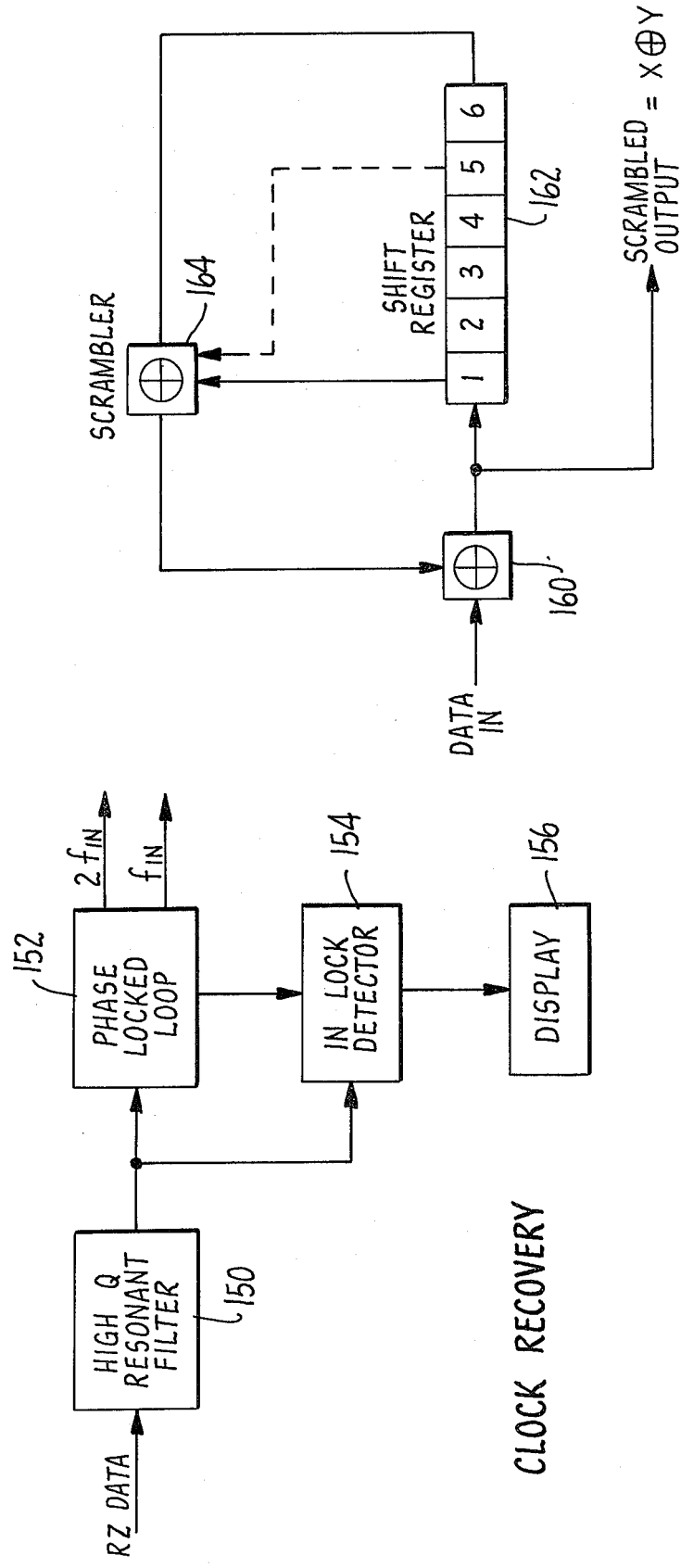

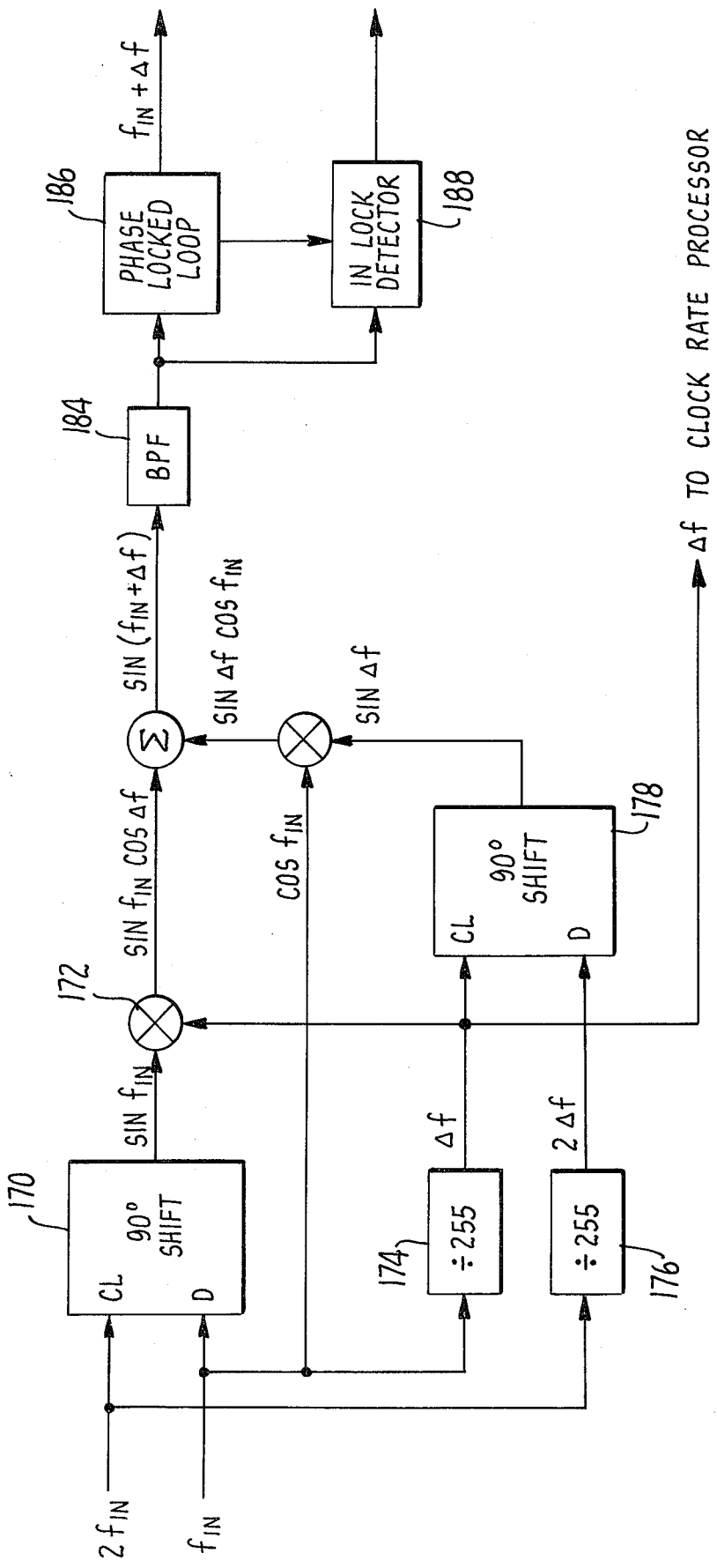
FIG. 5. — CLOCK RATE TRANSLATION LOOP

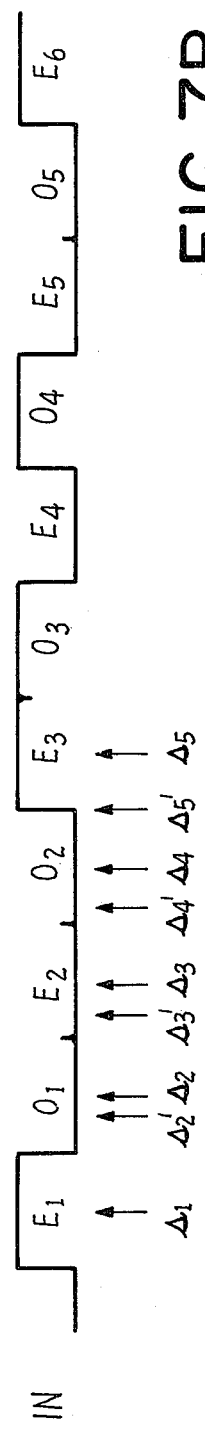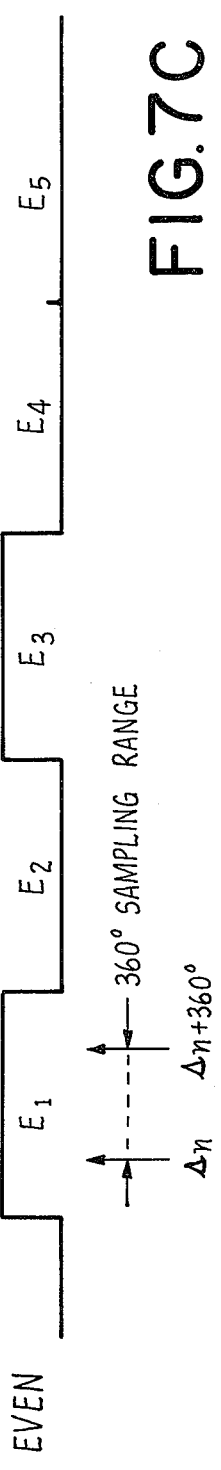

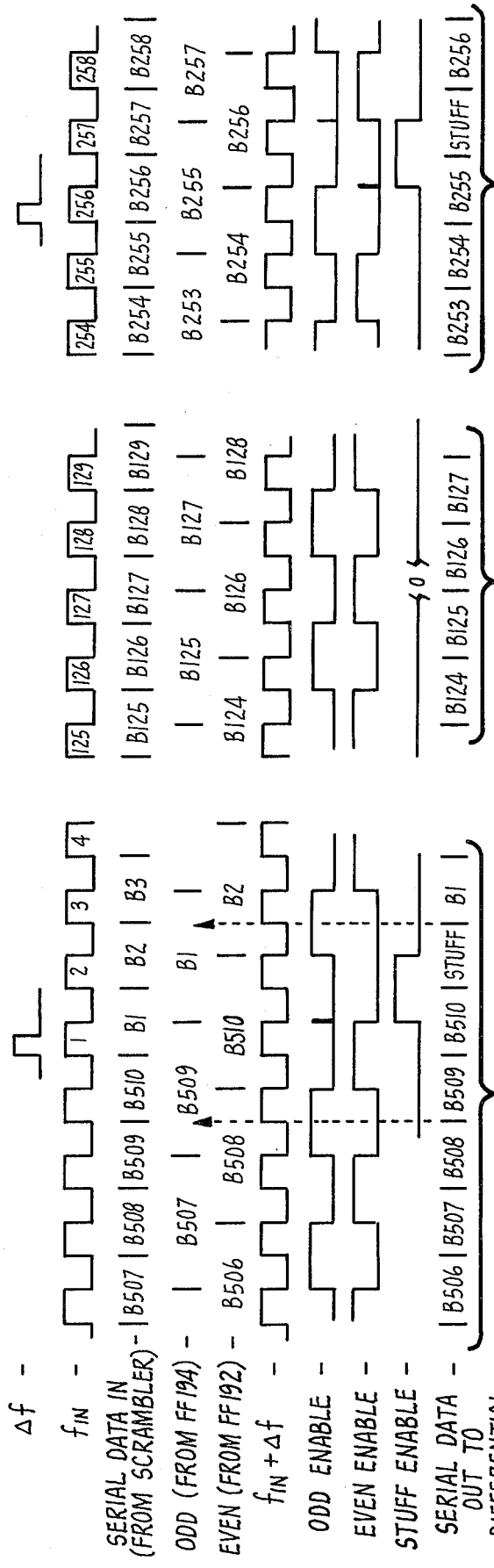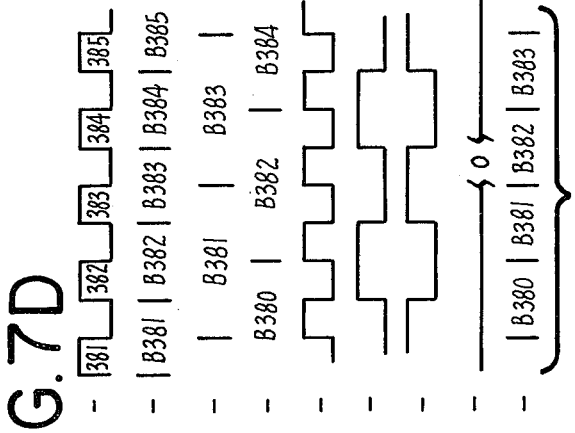

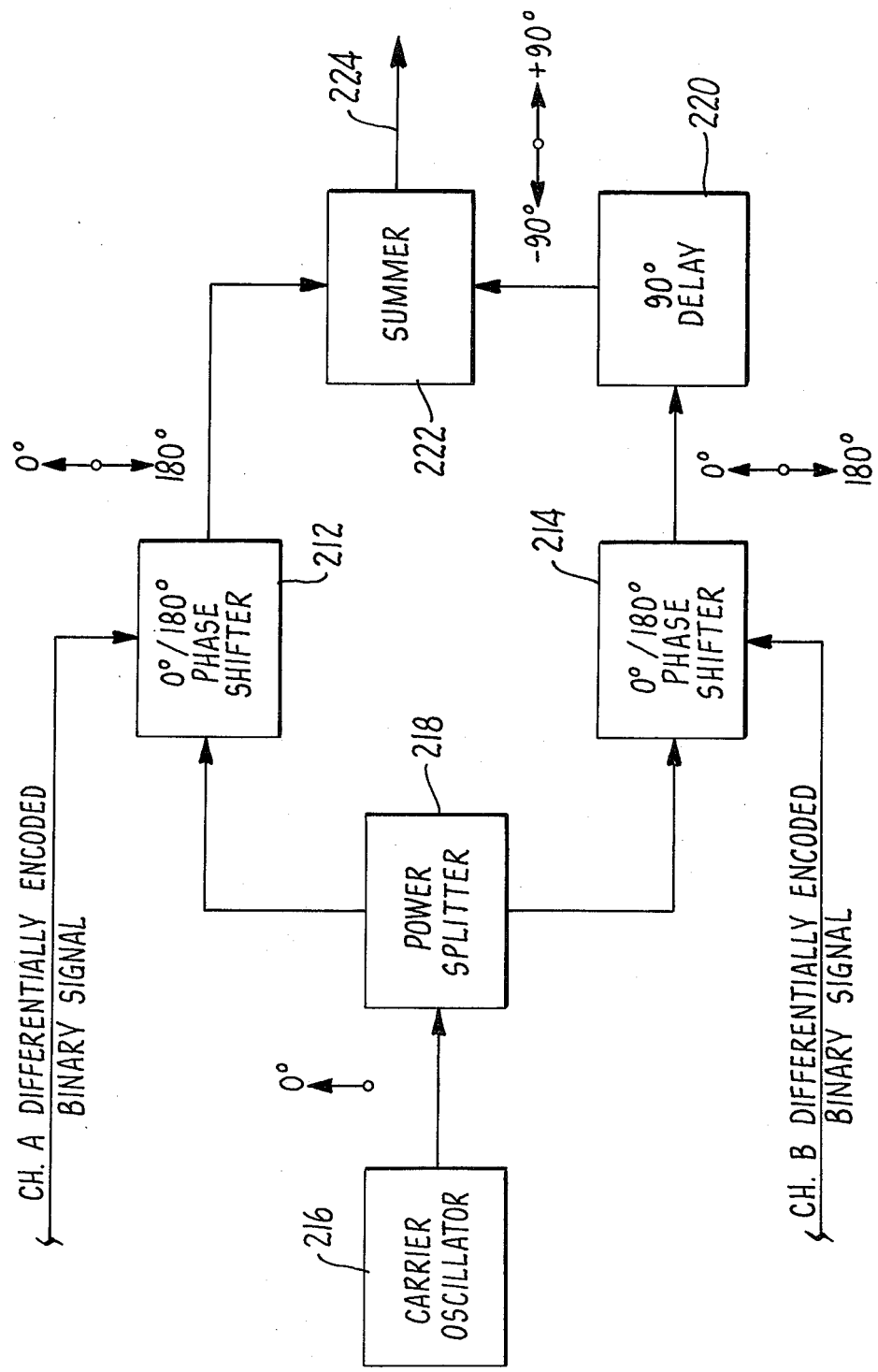

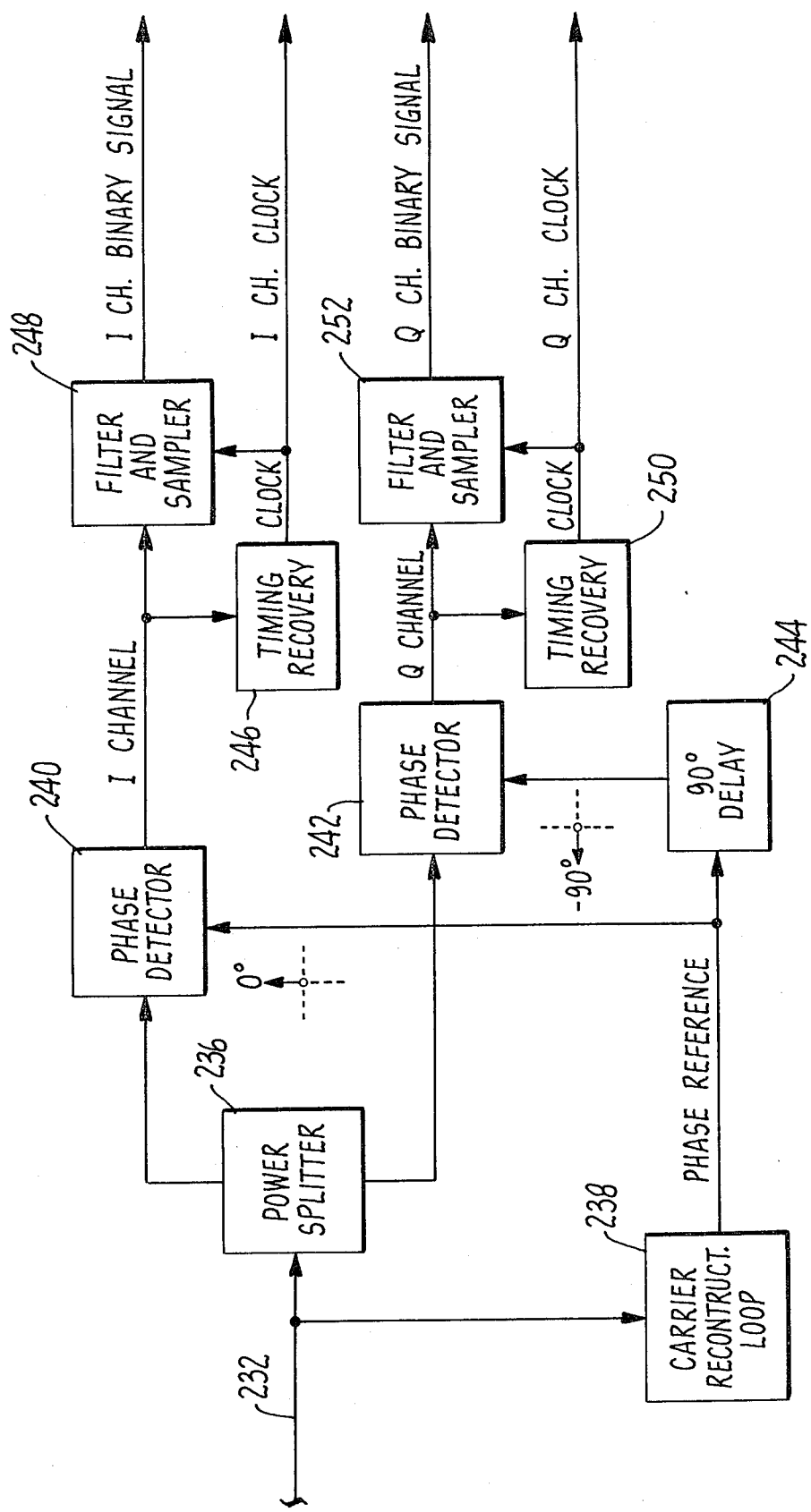

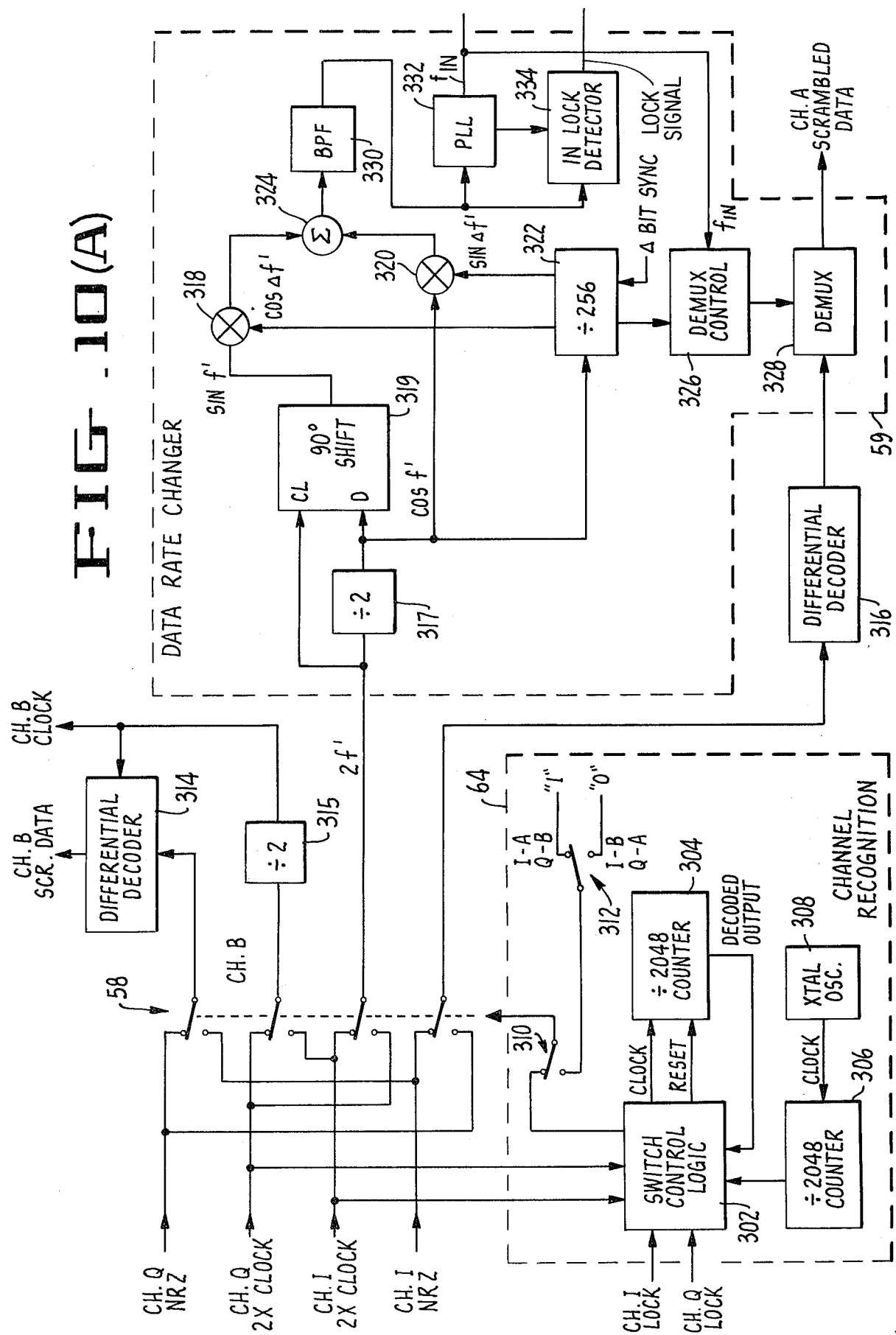

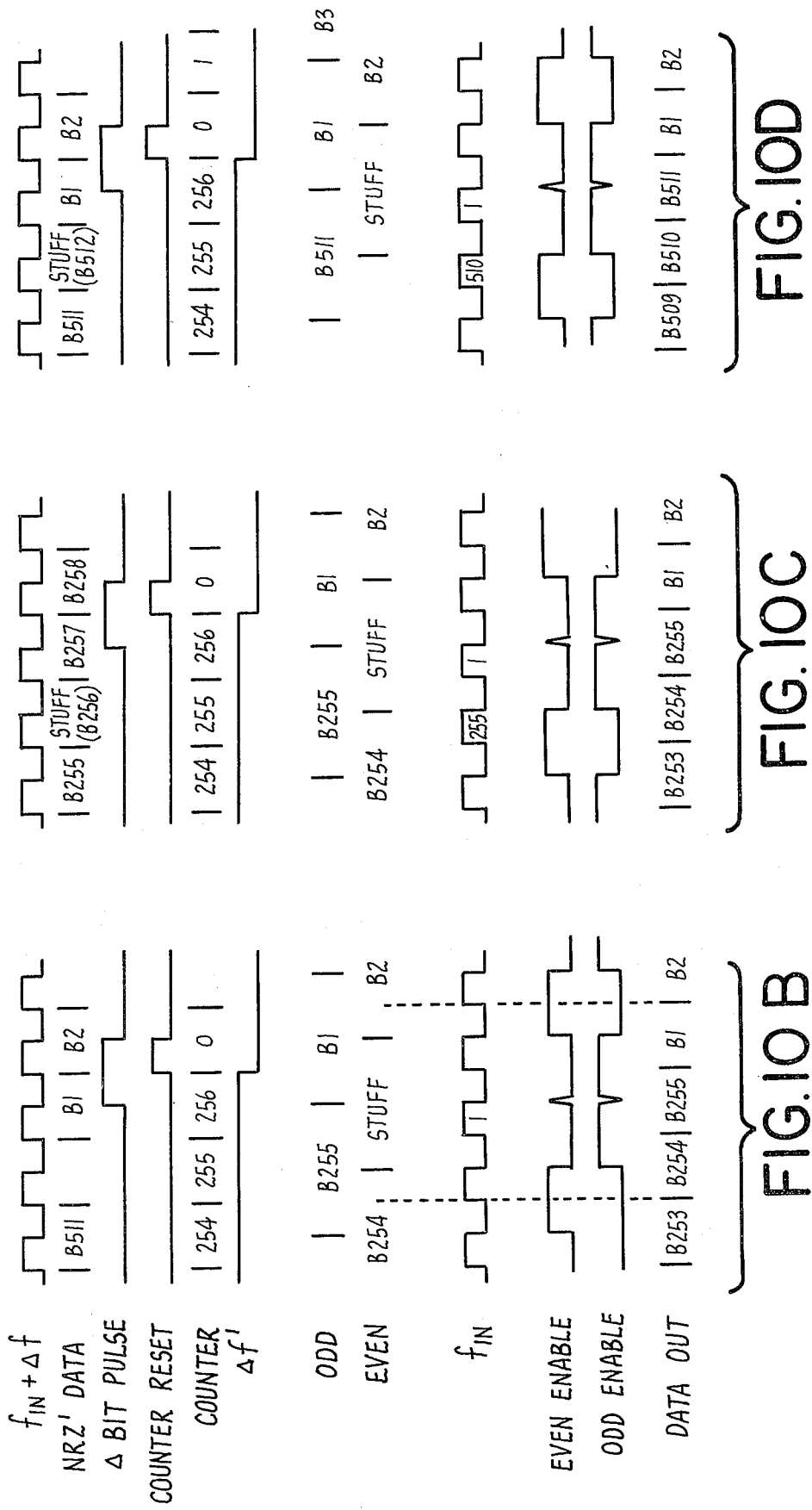

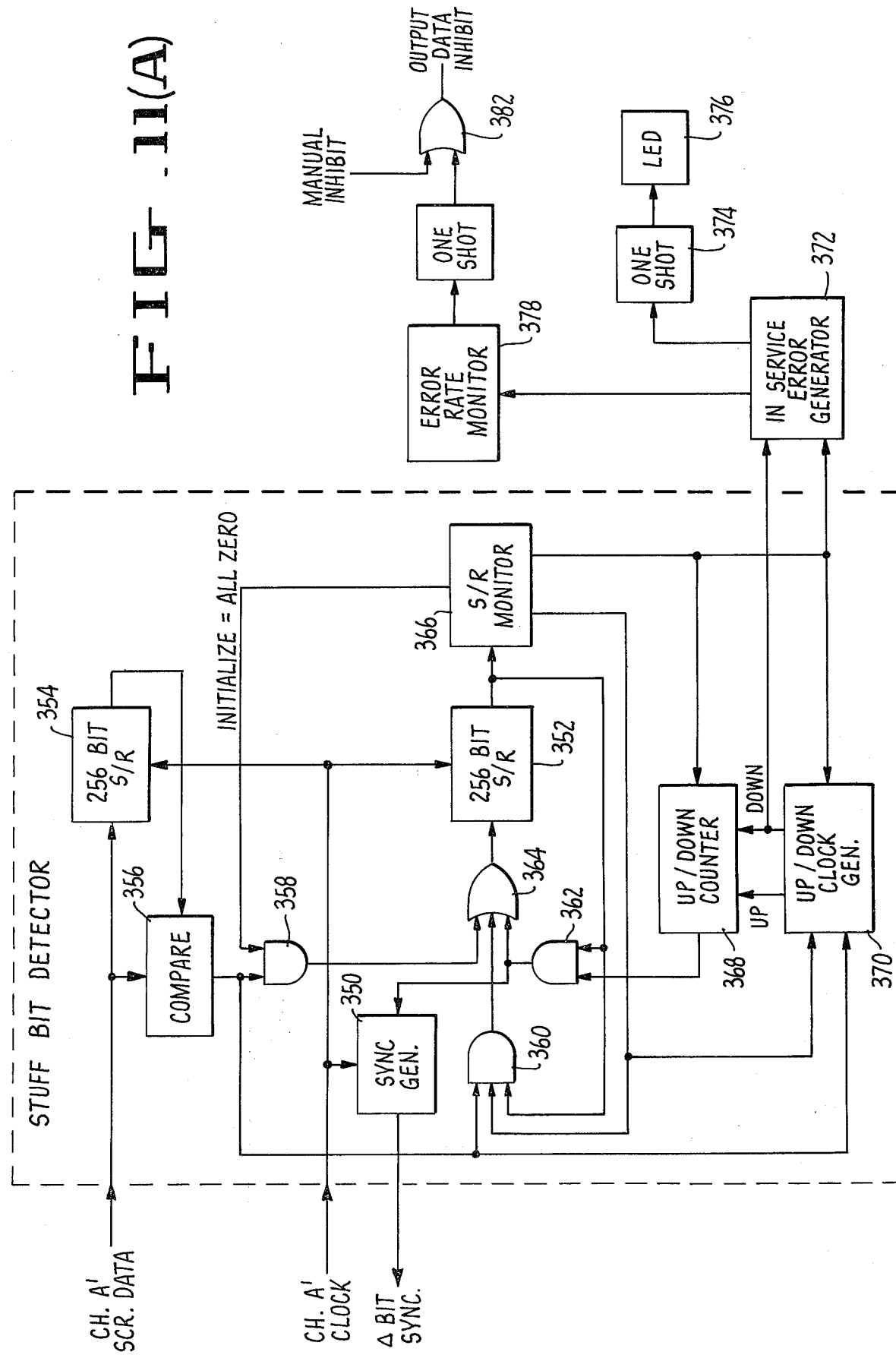

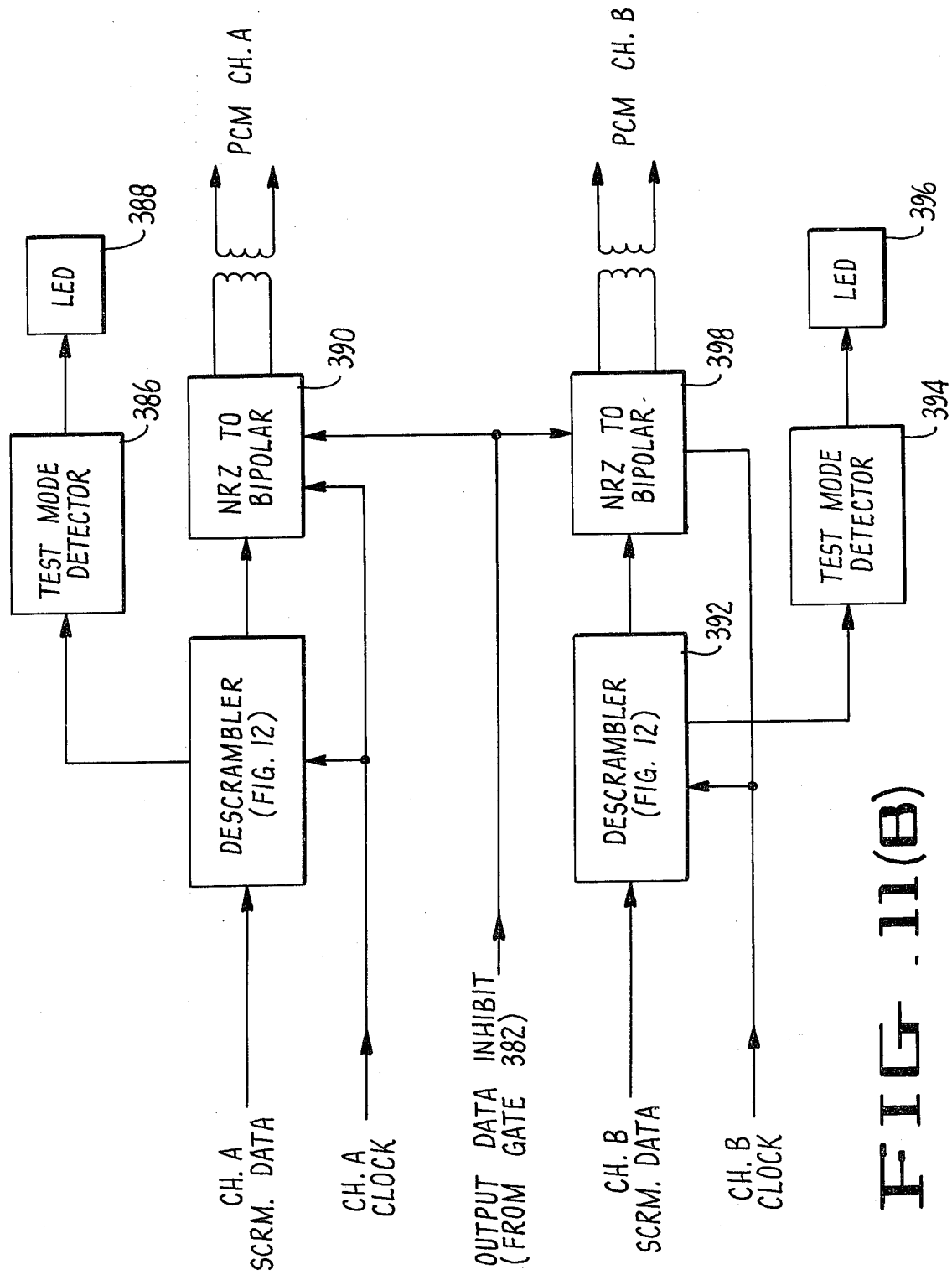

ASYNCHRONOUS QUADRIPHASE COMMUNICATIONS SYSTEM AND METHOD

This is a continuation-in-part of our copending application Ser. No. 225,823, filed Feb. 14, 1972, now Pat. No. 3,809,817.

BACKGROUND OF THE INVENTION

This invention relates to communications systems and more particularly to a system and method for transmitting and receiving two independently timed PCM (pulse code modulation) signals carried on a single quadriphase modulated carrier.

The quadriphase modulation technique is also known as quaternary phase shift keying, QPSK, four-phase modulation, four-level phase modulation and quaternary phase modulation.

As commonly implemented, the input to a quadriphase modulator is either two synchronous bit streams or a single serial bit stream that is divided into two parallel bit streams prior to carrier modulation. The timing for synchronous bit streams must be generated by the same oscillator or by phase-locked oscillators and the bit stream state transitions when they occur must coincide.

In a quadriphase modulated system, the receiver can detect phase shifts resulting from modulation but cannot measure the absolute phase states unless a transmitted phase reference is also provided. A transmitted reference requires additional power and is not commonly used. The receiver is usually designed to operate on the available information in the received signal to unambiguously demodulate and recover the original PCM bit streams.

In the case of synchronous quadriphase systems, unambiguous signal recovery is accomplished by digitally encoding the four possible PCM signal states, e.g., 00,01,10 or 11, into carrier phase changes of say no change for 00, +90° change for 01, −90° change for 10 and 180° change for 11. The receiver then, being able to uniquely detect carrier phase changes, unambiguously decodes them into the original PCM signal states. This type of encoding is known as quaternary differential encoding. Coding of this type is not possible, however, with asynchronous PCM input signals.

Early patents directed to conventional four-phase modulation systems having synchronous inputs include U.S. Pat. Nos. 2,870,431 to D. F. Babcock and 2,905,812 to M. L. Doelz et al.

In U.S. Pat. No. 3,242,262 to C. M. Melas et al., a four-phase modulator is disclosed wherein as an alternative, two separate unrelated channels of information may be applied. Recognition of the two original channels is provided by use of a known preamble; continuous identification is not provided.

A further four-phase modulation scheme having asynchronous data inputs is discussed in an article by Lucio M. Vallese in *Microwaves* for August 1971 at page 10. No means for providing unambiguous recognition of the asynchronous channels is disclosed.

In our parent application, Ser. No. 225, 823, filed Feb. 14, 1972, an asynchronous quadriphase communications system is disclosed handling mutually asynchronous input signals having a known characteristic, such as a framing bit. PN scrambling sequences are used to obscure the framing bit when the received channels are routed in the wrong sequence. In an alternative embodiment, mutually asynchronous input signals not having a known characteristic are handled by imposing a low index frequency modulation on the clock of each channel.

SUMMARY OF THE INVENTION

In accordance with the teachings of the present invention a new and improved method and system for quadriphase transmission of two mutually asynchronous PCM signals with unambiguous recognition and recovery of the original PCM transmitter input channels is provided, wherein the PCM input signals are not required to have a known characteristic.

This method, which will be referred to as asynchronous quadriphase, uniquely identifies one of the data channels prior to transmission. The receiver then looks for this unique signature and identifies the channels accordingly.

The system encoder accepts PCM signals, conditions and performs scrambling (optional), channel identification, and differential encoding operations on the data, and outputs a data stream suitable for driving a phase modulator. Two independently clocked PCM sources at the same nominal bit rate can be processed simulsimultaneously by the encoder. Provisions are also incorporated in the encoder for internally generating data suitable for system test purposes.

Inputs to the encoder consist of two mutually asynchronous bipolar PCM data streams designated as channels A and B. Each channel of data undergoes signal processing which consists of timing extraction, data scrambling, and differential encoding operations. In addition, the channel A data is further processed so that it can be uniquely identified by the receiver circuitry and reliably distinguished from the Channel B data. This further processing consists of slightly increasing the clock rate of the A channel, using a frequency translation loop. Circuitry in the receiver then distinguishes between the A and B channels on the basis of their respective frequencies. Additional receiver circuitry then reduces the modified A channel rate by the same fixed ratio so that it is restored back to the original rate.

Input data is changed from bipolar to return-to-zero (RZ) signal format. The RZ bit stream then drives a ringing filter which is a high Q resonant circuit tuned to the clock frequency. The purpose of the ringing filter is to selectively extract the clock frequency from the input signal spectrum. The ringing filter output is then fed to a phase-locked loop (PLL), which locks onto the clock frequency and generates a reconstructed clock for use in subsequent processing circuits. The clock derived from the PLL drives a flip-flop which converts the RZ data to non-return-to-zero (NRZ) data.

In normal operation, both the NRZ data and its associated clock are connected to a data scrambler. The scrambling operation is performed by modulo-two summing the NRZ data with an internally generated pseudonoise sequence. The scrambling operation is performed on the input data for the following reasons: first, it guarantees that active data will always be transmitted over the channel even though the input data may be temporarily all zeros. This in turn enables the bit synchronizer at the receive end to stay in lock. Second, it spreads the spectrum more uniformly over the occupied bandwidth reducing strong spectral components which may otherwise exist due to the characteristics of the input data; and third, it provides a means of performing an error test on the link. If these advantages are not desired, the scramblers may be omitted without otherwise affecting the system according to this invention.

The data output from the scrambler is simultaneously fed to two flip-flops which are clocked by timing signals at the same frequency but 180° out of phase with each other. These two timing signals are derived from a divide by two toggle operating off of the data clock, $f_{IN}$. The purpose of this circuitry is to split the scrambled data stream into two parallel data streams each occurring at half the original bit rate. These two data streams arbitrarily referred to as even and odd are connected to a multiplexer or data selection switch. The multiplexer sample rate is slightly higher than the effective input rate $f_{IN}$ by a fixed amount $\Delta f$. In order to compensate the data for this higher rate a stuff bit is inserted in the data stream exactly $\Delta f$ times per second by the multiplexer. The resulting data is designated as NRZ' to distinguish it from the original NRZ signal. The input to the multiplexer is divided into even and odd segments so that the data bits of each segment remain invariant during the uncertainty interval over which they are sampled. The multiplexer output NRZ' is then differentially encoded.

The slight increase in the Channel A timing and data rate is accomplished by means of a rate translation loop. This loop divides the input frequency $f_{IN}$ by $x$ then recombines it with the original frequency resulting in a slightly higher net output frequency, $f_o$. Specifically, $$f_o = f_{IN} + \frac{f_{IN}}{x} = \frac{x+1}{x} f_{IN}$$

The receiver circuitry performs the inverse operation so that the resulting output rate and data content are unchanged from the original input. For the receiver translation loop output, $$f_r = f_o - \frac{f_o}{x+1} = \frac{x f_o}{x+1} = \frac{x}{x+1} \times \frac{x+1}{x} f_{IN} = f_{IN}$$

The rate translation loop contains the digital equivalent of a single sideband modulator for generating the sum of two frequencies. Mathematically the operation is expressed as:

$$\sin(w_1 + w_2) = \sin w_1 \cos w_2 + \cos w_1 \sin w_2$$

After filtering, a phase locked loop is used to actually generate the higher output rate used to drive the multiplexer.

The multiplexer output NRZ' is then differentially encoded. The differential encoding operation causes a transition in the output data for every input data bit at a logic one. This operation results in the data information being conveyed in the relative transitions of the data, rather than in the absolute magnitude of the data themselves, thus avoiding data ambiguity which would otherwise exist at the receive end because of the absence of an absolute phase reference in the receiver.

The Channel B data undergoes scrambling and differential encoding operations similar to that for the Channel A data. There is no translation in frequency however for Channel B.

In addition to the normal mode of operation described above, there is also a test mode in which the input data is disconnected from the scrambler and steady logic level substituted. This allows the pseudo-noise (PN) sequence of the scrambler to be fed unaltered to the differential encoder for subsequent transmission. Although the PN sequence has random-like properties, the pattern is deterministic and thus can be examined on a bit-by-bit basis at the receiver end for the occurrence of bit errors.

The test mode uses an internally generated crystal controlled clock. This furnishes a stable clock to the scrambler and differential encoder when in the test mode and allows testing to be performed in the absence of an input data source. A separate oscillator is provided for each channel. Separate switches are also provided for each channel so that either channel can be tested independently of the other. The test mode for Channel A is enabled by either placing a switch in the TEST position or when there is no data input to Channel A. The test mode is enabled for Channel A upon loss of input signal to insure the continuous transmission of data to the receiver where circuitry monitors the stuff bit for the presence of in service errors. A high in service error rate is thus avoided even though the Channel A input has been disconnected. The test mode for Channel B is enabled only by placing a switch in the TEST position. If the data input to Channel B is removed, the clock obtained from the phase locked oscillator is inhibited when the phase locked oscillator drops out of lock which effectively inhibits an output from Channel B. Generating output data at a rate in excess of the normal clock rate due to the searching action of the out of lock phase locked loop is thus avoided for Channel B. The channel recognition unit resolves the ambiguity at the receiver between the I (in-phase) and Q (quadrature) channels received versus the A and B channels transmitted. This is done by measuring the relative timing of the I and Q channel data rates against a local reference. If the I or Q channel being measured exceeds the local reference by a certain amount, it is identified as the A channel and processed accordingly. For this situation the channel not being measured is assumed to be the B channel. Conversely if the channel being measured does not exceed the local reference by a given amount it is identified as the B channel with the other channel assumed to be the A channel. Once the A and B channels of data have been recognized, they are differentially decoded and the B Channel is outputed to the decoder for descrambling. The Channel A data rate is restored back to its original rate and the stuff bit inserted by the encoder is removed before the Channel A data is applied to the decoder for descrambling.

The decoder performs a descrambling operation on its input data and outputs a bipolar T-carrier compatible waveform. Two channels, A and B can be processed simultaneously by the decoder. The decoder performs operations inverse to those performed by the encoder in order to restore the output data back to its original format. The channel A and B descramblers each operate on different codes corresponding to the coding operations performed by the scramblers in the encoder unit.

The decoder also contains circuitry for detecting the presence of a stuff bit in the scrambled data for channel A'. Once the stuff bit is detected, a sync pulse is generated to permit the subsequent removal of the stuff bit. The stuff bit detector is also utilized to provide an in-service error monitoring capability. Whenever the in-service error rate becomes excessive ($>10^{-4}$, for example), the bipolar PCM output is inhibited for both channels.

BRIEF DESCRIPTION OF THE DRAWINGS

FIG. 3 is a block diagram of the clock recovery circuits of FIG. 2.

FIG. 4 is a block diagram of the scramblers of FIGS. 1 and 2.

FIG. 5 is a block diagram of the clock rate translation loop of FIG. 2.

FIGS. 7(a) through 7(h) are timing diagrams useful in understanding the data rate processor of FIG. 6.

FIG. 8 is a block diagram of the quadriphase modulator of FIG. 1.

FIG. 9 is a block diagram of the quadriphase demodulator of FIG. 1.

FIG. 10(a) is a block diagram of the channel recognition circuit and data rate changer of the asynchronous quadriphase receiver of FIG. 1.

FIGS. 10(b) through 10(d) are timing diagrams useful in understanding FIG. 10(a).

FIGS. 11(a) and 11(b) are block diagrams of the delta or stuff bit detector, error detector, descrambler and format converters of the asynchronous quadriphase receivers of FIG. 1.

DESCRIPTION OF THE PREFERRED EMBODIMENTS

Figure 1:
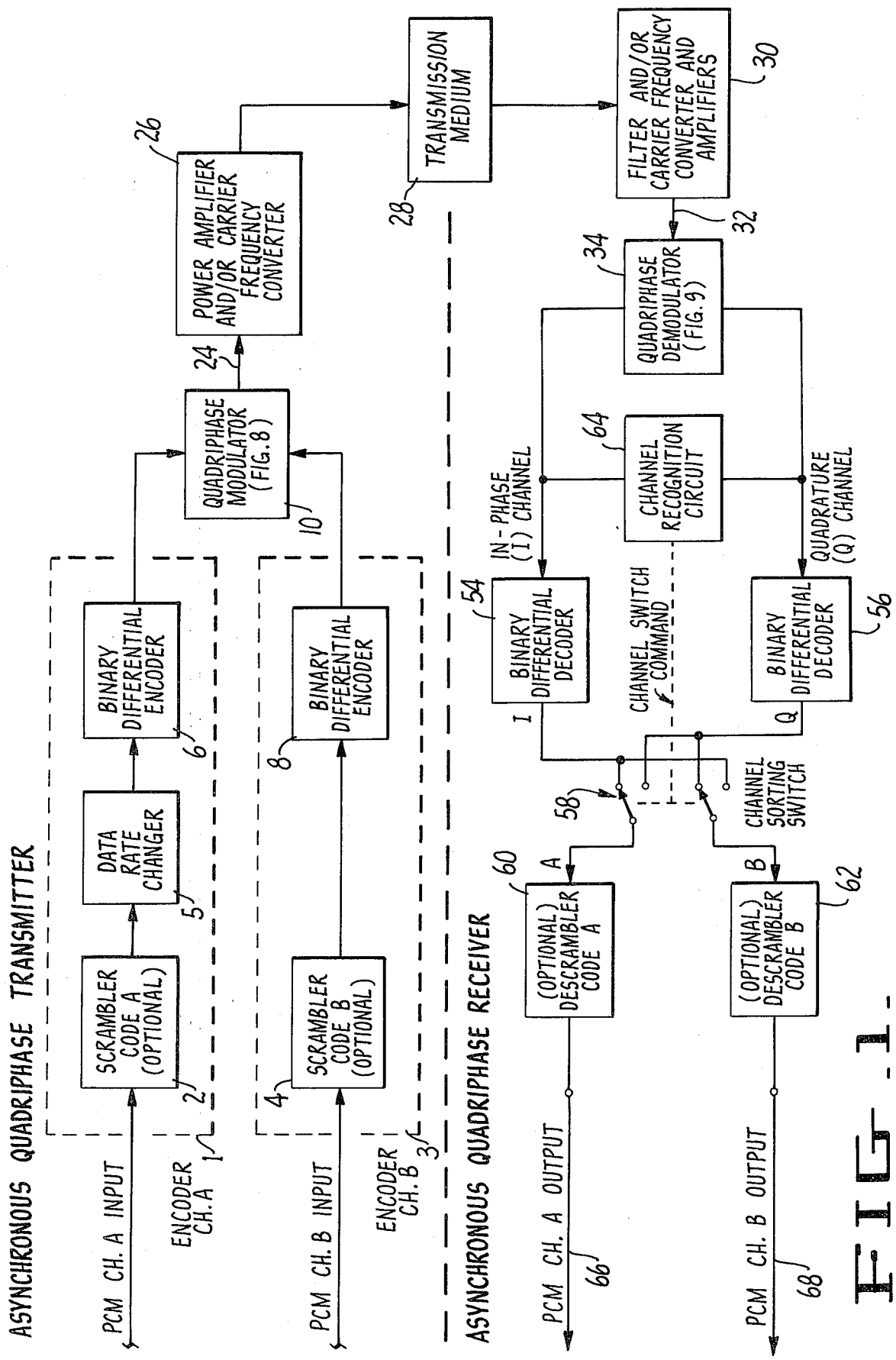
FIG. 1 is a block diagram of the overall asynchronous quadriphase communication system.

Referring now to FIGS. 1, 8, and 9 of the drawings, wherein FIG. 1 shows a basic block diagram of the overall asynchronous quadriphase transmitter/receiver system, FIG. 8 shows a functional block diagram of the quadriphase modulator of FIG. 1 and FIG. 9 shows a functional block diagram of the quadriphase demodulator of FIG. 1.

Figure 2:
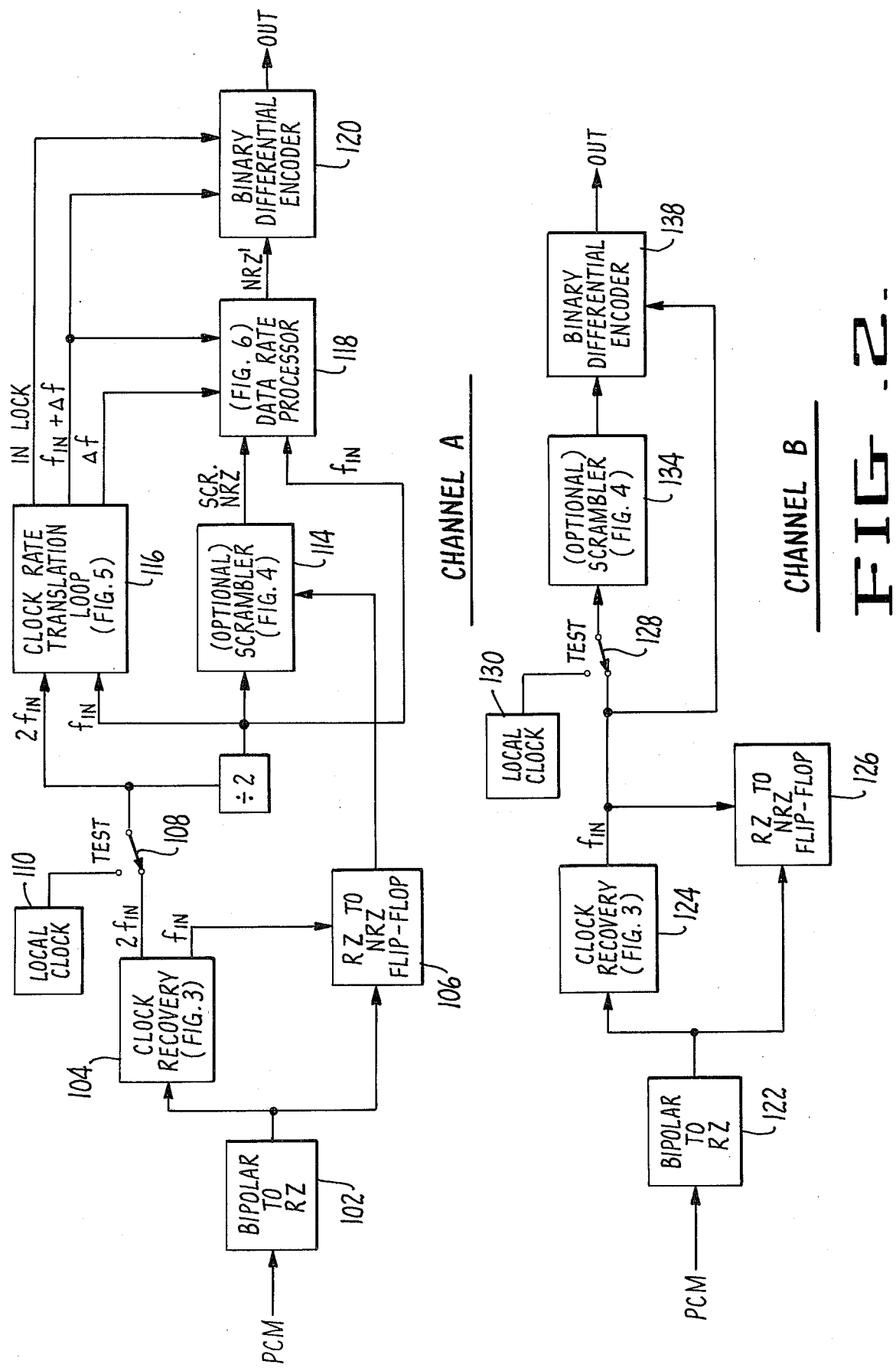
FIG. 2 is a block diagram of the encoders portion of FIG. 1.

A pair of PCM (pulse code modulation) data channels A and B, which are independently timed and are not in synchronism with each other, are applied, respectively to encoders 1 and 3, which are shown in greater detail in FIG. 2. Encoders 3 and 5 include a code A scrambler 2 and a code B scrambler 4, respectively. The scrambler codes A and B are sufficiently different so that the scrambled PCM signals can be distinguished in the receiver portion of the system. The scramblers are of conventional design and may take many specific forms. As discussed above, the scramblers are not essential to the invention, although they provide certain practical advantages. The output of each scrambler is applied to a pair of binary differential encoders 6 and 8, respectively, in order to modify each PCM channel for quadriphase modulation. The scrambler 2 output, however, is applied through a data rate changer 5 that modifies the data rate of channel A. The binary differential encoders 6 and 8 coupled with binary differential decoders in the receiver provides for resolution of the binary polarity ambiguity within each phase quadrature channel. The binary differential encoders are also per se conventional.

The outputs of the encoders 1 and 3 are applied to a quadriphase modulator 10, which is shown in greater detail in FIG. 8. Each of the two phase shifters 212 and 214 is independently controlled by one PCM channel. The binary data driving each phase shifter has been scrambled and differentially encoded. A binary zero at the differential encoder input results in no change in the corresponding phase shifter output; a binary one causes a 180° phase shift. The phase shifters 212 and 214 operate on a carrier at 0° derived from a carrier oscillator 216 and power splitter 218.

A 90° delay means 220 receives the phase shifter 214 output to provide a −90°/+90° phase shifting signal which is summed along with the phase shifter 212 output in a summer 222 to provide a four phase signal on line 224 to the power amplifier and/or carrier frequency converter 226 that is a conventional unit chosen to match the available transmission medium 28.

Similarly, the transmission medium determines the form of the receiver front-end filter, carrier frequency converter and amplifiers 30. These are also conventional communications circuits. The output of block 30 is applied on line 32 to the quadriphase demodulator 34, which is shown in greater functional detail in FIG. 9.

The received signal on line 232 is applied to a power splitter 236 and a carrier reconstruction loop 238. The carrier reconstruction loop 238 includes a phase-locked oscillator that maintains a fixed phase relationship with one of the four phase states of the received signal. The output of the carrier reconstruction loop oscillator provides the phase reference for demodulating the quadriphase signals. The power splitter 236 divides the received signal for application to phase detectors 240 and 242 that receive the phase reference signal (an arbitrary 0°) and a −90° reference signal (the phase reference signal delayed by 90° delay 244), respectively, to provide independent demodulation of the two phase quadrature signals. At this point in the receiver, there is no unique relationship between the phase detector outputs and the original inputs to the quadriphase modulator in the transmitter. This ambiguity occurs because the carrier reconstruction oscillator will phase-lock to any one of the four possible phase states and retain that phase relationship unless it loses phase-lock due to loss of signal or very high noise level.

The phase detector 240 output, designated the in-phase or I channel is applied to a conventional timing recovery circuit 246 to provide I channel clock pulses, and is applied to a conventional filter and sampler circuit 248 that provides a clean I channel binary signal. In the same manner the phase detector 242 output, designated the quadrature or Q channel, is applied to a timing recovery circuit 250 and filter and sampler circuit 252.

The I and Q channel binary and clock signals are applied to channel recognition circuit 64 and subsequently to binary differential decoders 54 and 56, respectively. The I channel may, for example, represent the original A channel or the B channel or one of the original channels with reversed polarity. The channel recognition circuit looks at the data rate of each channel and controls switch 58 to correctly sort the channels. The binary differential encoder and decoder in each channel resolve the polarity ambiguity. A data rate changer 59 restores channel A to its original rate. Channels A and B are then applied to a pair of descramblers 60 and 62. The descramblers 60 and 62 are matched to scrambling codes A and B in the transmitter portion.

FIG. 2 shows a functional block diagram of the transmitter encoders for channels A and B. The encoders accept PCM signals in T-carrier, 50 percent bipolar format, perform scrambling and differential encoding operations on them, and each output is a binary data stream suitable for driving a phase modulator. The A channel encoder also modifies the data rate. Two asynchronous PCM signal sources at a nominal 1.544 Mb/s rate are processed simultaneously. The invention is not limited to such PCM sources, however.

Bipolar PCM data from each data channel is coupled to respective interface stages 102 and 122 where it is converted into return to zero (RZ) format. The data in the RZ format is then applied to respective clock recovery circuits 104 and 124 and to further interface stages 106 and 126 which also receive the recovered clock signals to convert the RZ format data into non-return to zero (NRZ) format. The details of clock recovery circuit 104 and 124 are described further in conjunction with FIG. 3. The interface stages 102, 106, 122, and 126 are conventional and the implementation of such circuits is well known in the art.

Referring particularly to the channel A portion of FIG. 2, the clock recovery circuit 104 provides an $f_{IN}$ output at the clock rate of the PCM input signal and a $2f_{IN}$ output at twice the clock rate of the PCM input signal. A switch 108 is normally connected to receive the $2f_{IN}$ output from clock recovery circuit 104, but for test purposes the switch can be connected to a local clock source such as a crystal oscillator 110.

Switch 108 applies the $2f_{IN}$ signal to clock-rate translation loop 116, which is shown in further detail in FIG. 5, and to a divide by 2 block 112. The output of block 112 is $f_{IN}$ and is also applied to the clock-rate translation loop 116, to scrambler 114, which is shown in further detail in FIG. 4, and to data rate processor 118. The clock-rate translation loop 116 provides two clock signal outputs at the rates $f_{IN} + \Delta f$ and $\Delta f$. As will be understood, the clock rate $f_{IN} + \Delta f$ is the modified clock rate of the channel A data.

Scrambler 114 also receives the NRZ data from block 106 and provides a scrambled NRZ output to the data rate processor 118. The processor 118 also receives the $f_{IN} + \Delta f$ and the $\Delta f$ clock signals to provide a modified data output designated NRZ' at the modified clock rate for application to the binary differential encoder 120 which also receives the $f_{IN} + \Delta f$ clock signal from clock-rate translation loop 116. The output of binary differential encoder 120 is applied to the quadriphase modulator 10 of FIG. 1.

Referring now to the channel B portion of FIG. 2 the NRZ output of block 126 is applied to scrambler 134 which is shown in greater detail in FIG. 4. The scrambler also receives from switch 128 the recovered clock signal $f_{IN}$ or in the test mode a local clock signal from block 130 which may be a crystal oscillator, for example. The scrambled NRZ output from block 134 is applied to binary differential encoder 138 which also receives the clock signal $f_{IN}$ to provide an output to the quadriphase modulator 10 of FIG. 1.

FIG. 3 shows the clock recovery circuits 104 and 124 in greater detail. The input data in RZ format is applied first to a high Q resonant filter 150, also known in the art as a ringing filter. The filter will "ring" at its resonant frequency when a string of zeros is present at the input. The time constant of the envelope delay is Q/II cycles. Thus, with a Q of approximately 30, 10 successive zeros can occur before the filter output has decayed to 1/e of its initial value. A signal relatively stable in frequency is therefore presented at the filter output to the phase-locked loop 152. Loop 152 is conventional and includes a voltage controlled oscillator (VCO) operating at twice the clock frequency $f_{IN}$ which is divided by 2 and fed back to a phase detector (not shown). Thus, two outputs are available: $2f_{IN}$ and $f_{IN}$. The filter 150 also drives an in-lock detector 154 which can be, for example, a comparator comparing the signal derived from the filter with that obtained from the phase-lock loop. When the phase-lock loop is locked to the input a signal can be provided to display 156 which may be, for example, a light emitting diode.

Figure 12:
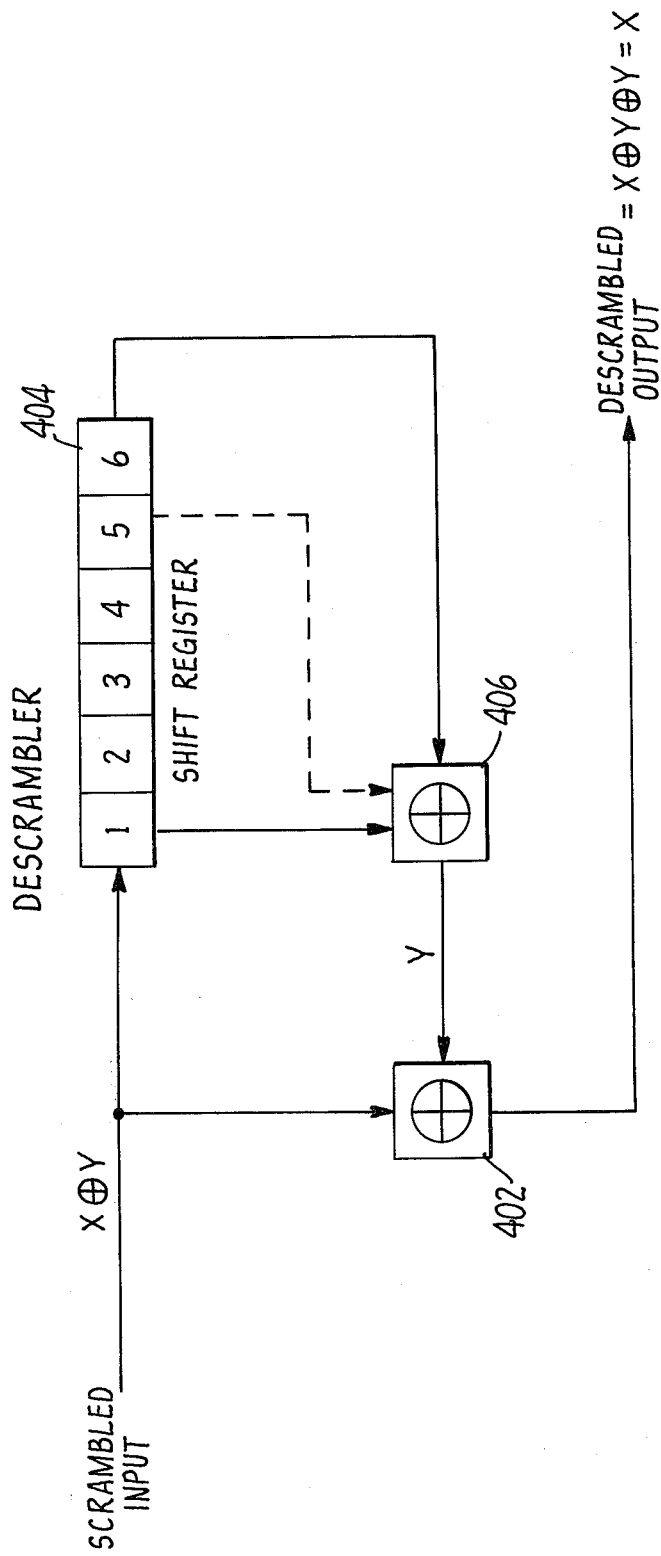
FIG. 12 is a block diagram of the descramblers of FIG. 1.

FIGS. 4 and 12 show the respective scrambler and descrambler operations in greater detail. The scrambler essentially consists of a six stage shift register 162 with feedback taps enabling it to generate a pseudo noise (PN) sequence. The feedback taps selected result in a maximum length sequence of $2^N-1$ bits where N is the number of stages in the register. For this case N = 6, the sequence length is 63 bits and the feedback taps are either taken from stages 6 and 5 or stages 6 and 1. The scrambled output is the modulo-two sum of the data input, X, and the output of the feedback shift register, Y. Blocks 160 and 164 indicate modulo-two summation functions.

When this scrambled output (X + Y) is applied directly to the input of similarly configured feedback shift register 404 and the shift register output (Y) is then modulo-two summed with the input, the original data input to the scrambler, X, is recovered. The channel A scrambler utilizes feedback taps 6 and 1, whereas the channel B scrambler utilizes taps 6 and 5. Blocks 402 and 406 indicate modulo-two summation functions.

Utilization of the scrambler for uniquely identifying channels is accomplished by using a different pseudo-noise (PN) sequence for each data channel. The inverse operation must be performed at the receive end to properly descramble the data and these descramblers are configured as shown in FIG. 12 to be compatible with the unique PN sequences generated by their respective scramblers.

FIG. 5 shows the clock-rate translation loop in greater detail. The purpose of the clock-rate translation loop is to provide an output clock signal at the rate $f_{IN} + \Delta f$. In this particular embodiment $\Delta f$ is $f_{IN} \div 255$. It will be apparent to those of ordinary skill in the art that $\Delta f$ may assume other values.

The rate translation loop contains the digital equivalent of the single side-band modulator for generating the sum of two frequencies. Mathematically, the operation is expressed as follows: $\sin(f_{IN}+\Delta f) = \sin f_{IN} \cos \Delta f + \cos f_{IN} \sin \Delta f$. The clock-rate translation loop thus functions to generate the $\Delta f$ clock frequency and to sum it with $f_{IN}$ to provide the modified clock-rate signal $f_{IN} + \Delta f$. The loop receives at its input the $f_{IN}$ and $2f_{IN}$ clock-rate signals which are applied to a 90° shift block 170 which provides at its output $\sin f_{IN}$. Block 170 is, for example, a D-type flip-flop receiving $f_{IN}$ at the data input and $2f_{IN}$ at the clock input. The $f_{IN}$ input clock is also applied to a divide by 255 counter 174 and to one input of an exclusive-or gate 180. The $2f_{IN}$ clock rate input signal is also applied to a divide by 255 block 176. The block 174 output, $f_{IN} \div 255$, is applied to a further 90° shift block 178 which also receives the output of block 176, $2f_{IN} \div 255$. Block 178 may also be a D-type flip-flop. The output of block 178 is $\sin \Delta f$ and is applied to the other input of exclusive-or gate 180 which thus provides at its output $\sin \Delta f \cos f_{IN}$. Exclusive-or gate 172 receives the sin $f_{IN}$ output of block 170 and the cos $\Delta f$ output from block 174 to provide sin $f_{IN}$ cos $\Delta f$ to summer 182 which also receives the output of exclusive-or gate 180 to thus provide the summation term which is equivalent to sin($f_{IN} + \Delta f$). This signal is applied to a bandpass filter 184 at the frequency $f_{IN}+\Delta f$ and the filtered signal is then applied to a conventional phase-locked loop 186 which provides at its output a clean clock signal at the frequency $f_{IN}+\Delta f$. An in-lock detector such as a comparator 188 receives the loop output and input to provide a signal indicating when the loop is in lock.

Figure 6:
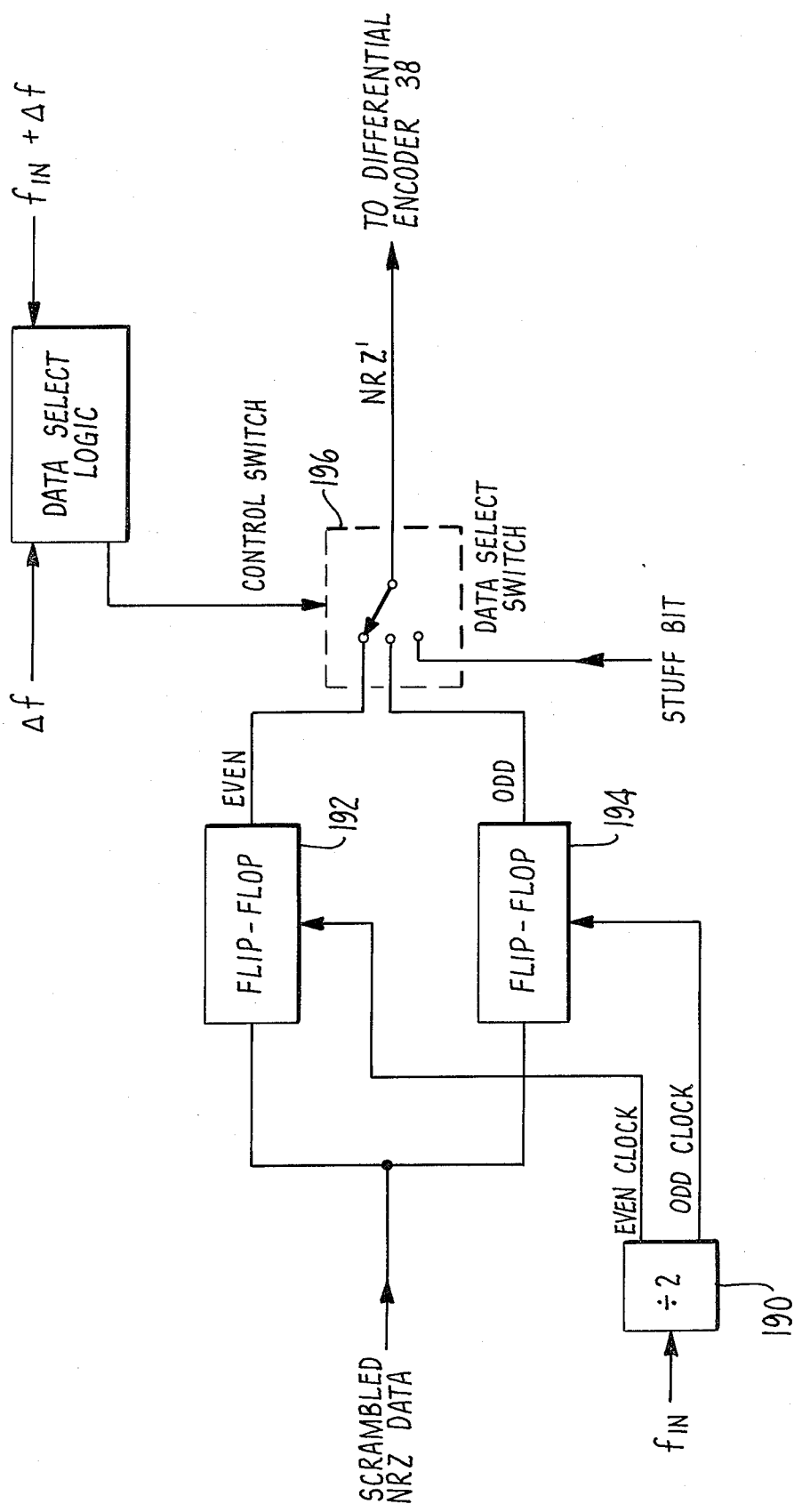
FIG. 6 is a block diagram of the data rate processor of FIG. 2.

FIG. 6 shows the data rate processor 118 in greater detail. Reference is also made to FIG. 7a, b, and c, which shows a series of wave forms useful in understanding the operation of the data rate processor. The purpose of the data rate processor is to convert the scrambled NRZ data at clock rate $f_{IN}$ to scrambled NRZ data at clock rate $f_{IN}+\Delta f$. In accomplishing this, a "stuff" bit or $\Delta$ bit is added every 256th bit as will be explained. The stuff bit is preferably a logic "0", although those of ordinary skill in the art will appreciate that it can be a logic "1" or possibly alternating 1 and 0, or other deterministic patterns. The stuff bit defines frames of data.

The scrambled NRZ data is applied to first and second flip-flops 192 and 194. The flip-flops are clocked by even and odd phases of the $f_{IN}$ clock provided at the output of divide by 2 counter 190 such that flip-flop 192 provides an "even" data output and flip-flop 194 provides an "odd" data output. These outputs are applied to a multiplexer 196 which is shown for simplicity as a switch which selects from the even and odd data outputs of the flip-flops and a stuff bit. The multiplexer or switch is controlled by a data select logic block 198 which receives the $\Delta f$ clock and the $f_{IN}+\Delta f$ clock.

It will be appreciated that in order to increase the data rate in channel A by $\Delta f$, which in this example is $f_{IN} \div 255$, it is necessary to shorten the length of each original bit by $1 \div 256$. The sampling of switch 196 must take place at the faster clock rate. However, unless the input scrambled NRZ data is broken into even and odd phases the sampling point will slide relative to the slower clock rate of the input data resulting in an ambiguous sample at the end of the 255 bit period. This is best understood by reference to FIGS. 7a, b, and c.

FIG. 7A shows exemplary scrambled NRZ data as it is applied to the flip-flops 192 and 194. Each consecutive cell of data is designated even (E) and odd (O). The $f_{IN}$ clock period is equal to the width of each data cell and is indicated by the 360° arrows above cell $E_1$. If the original data of FIG. 7A is sampled at the faster clock rate $f_{IN} + \Delta f$, then the sample times relative to each data cell will be progressively advanced. This is indicated in a somewhat exaggerated manner by the arrows below the data cells of FIG. 7A. For example, the first sample, sample $s_1$, in data cell $E_1$ occurs at the center of the data cell. One assumes that the $f_{IN}$ and $f_{IN} + \Delta f$ clocks are coincident at this particular time. However, at the next data cell $O_1$, while a sample $s_2$ taken according to the input clock $f_{IN}$ would occur at the center of the data cell, the sample $s_2$, taken according to the $f_{IN} + \Delta f$ clock would be advanced. As the samples continue to occur in successive data cells the $f_{IN} +\Delta f$ clock sample occurs progressively earlier in the data cell until, for example, in cell $E_3$ the sample $s_5$ occurs at the boundary between $E_3$ and $E_2$, causing an ambiguous sampling. The displacement of the sample from sample point $s_5$ to the sample point $s_5$, is only a 180° shift. It will be apparent that the sample point will shift over the full 360° range. That is, over a 256 bit period, there is a 360° slippage between the faster output clock $f_{IN} + \Delta f$ relative to the input clock rate $f_{IN}$.

In order to overcome this sampling problem with the increased $f_{IN} + \Delta f$ sampling rate, the scrambled NRZ data is broken into even and odd bit streams, such as shown in FIGS. 7B and 7C. By doing so, the range of possible sample times over the 360° period can be completely contained within the width of a bit cell. This is shown schematically with reference to bit cell $E_1$ of waveform 7B.

Thus, the data select switch or multiplexer 196 of FIG. 6 can alternately sample the even and odd data bit streams from the flip-flops 192 and 194 to provide 255 bits of information data and then add the stuff bit or delta bit as the 256th bit in real time.

FIGS. 7D through 7H show further timing waveforms useful in understanding the subject matter of FIG. 6. These figures show relative timings at five portions during a two frame interval. The original clock $f_{IN}$ is shown for reference. The serial data (in scrambled NRZ form) is shown schematically as bit cells labeled B1 through B510. Likewise, the odd (from flip-flop 194) and even (from flip-flop 192) bit cells are labeled B1 through B509 (odd digits) and B2 through B510 (even digits), respectively. The $\Delta f$ and $f_{IN} + \Delta f$ clock pulses are shown. Within data select logic 198, "odd enable" and "even enable" pulses are derived from the $f_{IN} + \Delta f$ clock. "Stuff enable" pulses are derived from the $f_{IN} + \Delta f$ clock subsequent to the occurrence of a $\Delta f$ clock pulse. The odd/even enable pulses are inhibited during a stuff enable pulse. Sampling of data occurs at the positive going edge of a clock pulse. Thus, for example odd bit B509 is sampled at the positive going clock ($f_{IN} + \Delta f$) pulse when the odd enable is high. Note the relatively shifted locations (shown by arrows and dashed lines) of the B509 and B1 samples within each respective bit cell. These positions are the extremes of the sampling points throughout the frame and are well within the bit cells so as to avoid ambiguous samples. It will be apparent to those of ordinary skill in the art that the precise logic arrangement of FIG. 6 may take many forms within the scope of these teachings.

It will be apparent to those of ordinary skill in the art that various other means may be provided for increasing the clock rate of the data from channel A. For example, a memory or memories may be provided in which the data is read in at a first rate and read out at the second rate. The invention is not to be limited to the particular means for increasing the clock rate as disclosed herein.

Referring now to FIG. 10 wherein the channel recognition circuit and data rate changer of the asynchronous quadriphase receiver of FIG. 1 are shown in greater detail.

The channel recognition circuit 64 resolves the ambiguity at the receiver between the I (in-phase) and Q (quadrature) channels received versus the A and B channels transmitted. The channel recognition circuit does this by measuring the relative timing of the I or Q channel data rates against a reference. If the I or Q channel being measured exceeds the reference by a certain amount, it is identified as the A channel and processed accordingly. For this situation, the channel not being measured is assumed to be the B channel. Conversely, if the channel being measured does not exceed the reference by a given amount it is identified as the B channel with the other channel assumed to be the A channel. Once the A and B channels of data have been recognized, the B channel is differentially decoded and subsequently descrambled. The A channel is applied to the data rate changer 59 and is restored back to its original rate and the stuff bit or delta bit inserted by the transmitter is removed before the signal is applied to the descrambler. The reference will typically be a local clock reference, however, the clocks of the two channels, I and Q, could be compared to each other.

The channel recognition circuit 64 receives the I and Q channel clock signals at double frequency which are applied to switch control logic 302. Either the I or Q clock is examined, however, the channel examined must have valid data present before it will be monitored as determined by in lock signals applied to logic 302. A crystal oscillator operating at double the $f_{IN}$ clock frequency (the channel B clock frequency) of 3.088MHz, for example, applies a clock signal to counter 306. Counter 306 is a divide by 2,048 counter and it provides a reference for resetting counter 304. It is necessary to distinguish between channel timing which has been modified versus that which has been scaled up by a factor of $256 \div 255$. This amount of scaling over a count of 2,048 results in a count of approximately 2,056 or about 8 extra counts. If the channel being monitored exceeds 2,052 or four extra counts over the reference interval of 2,048 counts a decision in favor of channel A is made. Counts equal to or less than 2,052 result in decisions favoring channel B. Thus, counter 304 is clocked by the I or Q clock input and a decoded output of the count is applied to logic 302 which looks for the 2052 count and decides in favor of channel A if that count is received before the 2048 reference count from counter 306 and in favor of channel B if the reference count is received before the 2052 count from counter 304, thereby making the decision to provide a control signal to the channel sorting switch 58. It will be appreciated that the reference signal provided by oscillator 308 may alternatively be the clock signal from the other channel.

The channel B output from switch 58 is differentially decoded by applying the NRZ data and the clock signal to differential decoder 314, the output of which is applied to further circuitry shown in FIG. 11 explained below. It is evident that the embodiment described above is a digital implementation of the function of a frequency discriminator; this function could also be implemented in other ways such as by using an analog discriminator or a single sideband modulator.

The channel A NRZ' data and clock are applied to a further differential decoder 316. The decoded NRZ' data and the channel A clock are applied to the data rate changer circuit 59. Circuit 59 provides the inverse function of the data rate changer 5 of the transmitter portion of the system. That is, it reduces the data rate of the channel A information by a factor of $255 \div 256$. It also removes the stuff bit or Δ bit and thus provides the originally timed channel A data signal.

Data rate changer 59 receives the channel A double frequency clock signal and also the output of differential decoder 316. A rate translation loop similar to that of the transmitter circuitry is used to slow down the timing by an amount required for the removal of the stuff bit. The double frequency clock signal $2f'$ (where $f'$ if $f_{IN} + \Delta f$) is applied to a divide by two block 317 and to a 90° shift block, which can be a D-type flip-flop as in FIG. 5, which provides a sin $f'$ output to exclusive-OR gate 318. The $f'$ clock is applied to a divide by 256 counter 322 and a further exclusive-OR gate 320 as the cos $f'$ signal. The divider 322 provides cos $\Delta f'$ and sin $\Delta f'$ outputs to the respective exclusive-OR gates 318 and 320. The output of gate 318 is sin $f'$ cos $\Delta f'$ and the output of gate 320 is cos $f'$ ($-\sin \Delta f$). These two signals are added in a summer 324 which applies the signal sin $(f'-\Delta f')$ to a bandpass filter 330. Mathematically, the operation corresponds to (sin $f'$) (cos$\Delta f'$)−(cos $f'$) (sin$\Delta f'$)=sin $(f'-\Delta f)$. Since $\Delta f' = f' \div 256$ and $f' - \Delta f'$ is $255 \div 256 \times f'$ which is the exact amount of frequency reduction required to restore the modified A channel back to the original A rate. The output of filter 330 is applied to a phase lock loop 332 which locks on to the filtered signal and generates a clock at the desired rate $f_{IN}$. A lock detector or comparator 334 looks at the loop input and output and provides a signal indicating locked condition.

The stuff bit must also be removed and the data reclocked at the slower A rate of $f_{IN}$. The presence and location of the stuff bit and the serial data stream of the modified A channel is determined by circuitry forming a portion of FIG. 11, described below. A Δ bit sync pulse is generated to locate when the periodic stuff bit occurs. This pulse is applied to counter 322 and resets the divide by 256 counter so that the counter overflow has a fixed timing relationship with the occurrence of the stuff bit. All data bits are sampled except for the stuff bit which effectively deletes the stuff bit from the data stream. The demultiplexer control 326 receives the slow clock and an output from counter 322 for controlling demultiplexer 328. The demultiplexer samples all bits except for the stuff bit which thereby effectively deletes the stuff bit from the output data stream. The sample bits are then reclocked into a flip-flop contained in the demultiplexer 328 at the slower data rate, buffered and then applied to the circuitry on FIG. 11.

FIGS. 10(b) through 10(d) show various timing waveforms useful in understanding FIG. 10(a), particularly as to the demultiplexer 328 and demultiplexer control 326. As done in FIGS. 7(d) through 7(h), FIGS. 10(b) through (d) show relative timings at portions during a two frame interval. The NRZ' data from differential decoder is shown as bit cells B1 through B511 plus the stuff bit cells (B256 and B512). The fast clock $f' = f_{IN} + \Delta f$ is shown above the bit cells. The Δ bit sync pulse from FIG. 11 (delayed a half clock pulse due to inherent circuit delays) resets the 256 counter 322. The counter periods are shown as cells 1 through 256 with a 0 cell occurring at reset. The counter provides two $\Delta f'$ outputs ($\Delta f' = f' \div 256 = (f_{IN} + \Delta f) \div 256$), one of which is shown in the FIGS. 10(b) – 10(d). The other $\Delta f'$ output is delayed 90°. The NRZ' data is divided into odd and even streams in demultiplexer 328 in a manner such as in FIG. 6 (not shown in FIG. 10(a)). The demultiplexer control 326 receives the original $f_{IN}$ clock from PLL 332 and generates even-enable and odd-enable pulses as shown, which are inhibited by the Δ bit pulse. Thus the occurrence of a positive going $f_{IN}$ clock pulse and an odd or even enable pulse causes sampling of the odd and even NRZ' data, thereby providing output data at the original channel Δ rate. Note the relative positions (shown by arrows and dashed lines 1 of the samples in cells B254 and B2. As in FIG. 7(d), these are the extremes of the sample point locations within a bit cell.

Referring now to the details of FIG. 11, the stuff bit detector which provides the stuff bit or delta bit sync pulse to the data rate changer 59 of FIG. 10 is shown along with the descramblers and NRZ to polar format converters for channels A and channel B. Also, error detecting circuitry for inhibiting the channel A and channel B outputs when a stuff bit is not detected is shown.

The stuff bit detector receives the modified (i.e. fast) channel A scrambled data and channel A clock signals at the $f'$ rate. It will be recalled that the stuff bit is preferably a logic zero that is inserted after every 255 of the channel A data bits. Basically the stuff bit is detected by comparing a received data bit with one that has been delayed by exactly 256 clock intervals and noting which bits spaced at the interval are consistently at a logic zero. A 256 bit shift register 354 is used for delaying the data.

Another 256 bit shift register is used for search, acquisition, and tracking of the stuff bit and will be referred to as the tracking register. The stuff bit detector operates in three modes: search, acquisition and tracking. The search mode consists of comparing one frame of data with the previous frame of data stored in shift register 354 on a bit by bit basis and entering information in shift register 352 regarding which bits satisfied the stuff bit criterion. A frame, defined by the stuff bit, consists of 256 bits of data. Before the search mode can be entered all cells in the tracking register 352 must be empty. On the average one fourth of the cells (64) will get filled during a one frame search due to random data along. Following the one frame search mode, an acquisition mode is entered in which no additional cells in shift register 352 can be filled. Instead those cells which had been filled during the search mode are allowed to remain provided that the bit comparator continues to satisfy the stuff bit criterion with each successive frame. Failure to satisfy this criterion will cause a previously filled cell to be cleared or emptied. The acquisition mode continues for as many frames of data as required until only a single cell remains full. This cell and its location correspond to the stuff bit.

On the average half of the cells that were filled due to random data will be cleared on each successive frame during the acquisition mode. For example, had 128 cells been filled during the one frame of search mode data, 64 cells would have been cleared (on the average) after the first frame of data in the acquisition mode leaving 64 cells still full. Following the second frame of data, 32 cells on the average would remain full, 16 after the third frame, converging down to a single cell after the seventh frame of data in the acquisition mode. The acquisition mode by clearing those cells which fail to meet the stuff bit criterion after each frame of data ensures convergence to the actual stuff bit when present. Finally, only a single cell should remain full in the tracking register which corresponds to the stuff bit. When this occurs the acquisition mode ceases and the tracking mode commences. The average acquisition time to converge on the stuff bit is approximately 1.5 milliseconds. The probability of acquiring the stuff bit within 4 milliseconds is greater than 0.9999. During the tracking mode the single cell corresponding to the stuff bit is allowed to circulate in the tracking register. In addition the bit comparator 356 is continually examining each new frame of data for compliance with the stuff bit criterion and the output from this comparator generates a clock at the stuff bit time determined by the circulating bit in the tracking register. This clock will increment an up/down counter 368 if the comparator output satisfies the stuff bit criterion, otherwise, the counter will be decremented. The counter is clamped in the reset state during the search and acquisition modes and allowed to count only in the tracking mode. The counter can be incremented as long as it is not already at a full scale count of fifteen. Conversely it can be decremented as long as it contains a count greater than zero. In this manner overflows and under flows are avoided. This counter provides the capability of being able to track a stuff bit even in a noisy environment where bit errors are occurring during the stuff bit interval. A bit error rate exceeding 33% is required to cause the stuff bit detector to change from the tracking mode to the search mode. Should the counter be decremented to zero, the cell in the tracking register 352 corresponding to the stuff bit is no longer allowed to circulate but instead is cleared. Once cleared, all cells in the tracking register will be empty and this condition initiates the start of the search mode.

The circulating bit in the tracking register is used as a timing pulse to synchronize the data rate changer of FIG. 10. This pulse is called "Δ Bit Sync."

The number of full cells in the tracking register 352 determines the mode of operation for the stuff bit detector. The shift register monitor 366 has three outputs which depend on the register 352 contents. If each of the 256 cells is empty, the search mode is initiated which spans exactly one frame of data and fills those cells which are stuff bit candidates. This is accomplished by monitor 366 applying a logic 1 to AND-gate 358. When more than one cell is full the acquisition mode is in effect which continually cycles through successive frames of data. For this mode monitor 366 applies a logic 1 to AND-gate 360. During each cycle every full cell of the tracking register is tested against its corresponding received data bit for continued compliance with stuff bit criterion. Those full cells which fail the test are emptied until a single full cell is converged upon. When only a single cell is full the tracking mode is entered and the stuff bit is presumed to have been found. In that case, monitor 366 enables counter 368.

Monitor 366 includes a two stage shift register (not shown) to monitor the cell status of the tracking register 352. Each full cell in the tracking register generates a shift clock for the two stage shift register which gets reset once per frame. At the end of each frame the status of the two stage shift register is sampled and stored. Decode gates (not shown) determine whether none, one, or more than one shift clock has been received by the two stage shift register during the 256 bit frame interval. This information which is then stored determines whether the stuff bit detector will operate in the search, acquisition, or tracking mode for the next frame interval.

As an optional feature, an in-service error generator 372 also receives the tracking mode output of monitor 366 and the down counts of up/down clock generator 370. The output from monitor 366 indicates a no error condition, whereas down counts from clock generator 370 indicate errors. When a predetermined number of errors occur during a selected time period the error rate monitor 378 triggers one shot 380 for a short time period. The one shot is continually retriggered as long as the bit error rate exceeds one part per ten thousand bits. A second retriggerable one shot 374 is triggered by the individual error pulses and generates a pulse a quarter of a second long which turns on an LED indicator 376 which may be observed by the system operator. Since the in-service error pulse is obtained from the comparison of successive stuff bits, an error occurring in one stuff bit position will result in two in-service error pulses.

The output of one shot 380 is applied to an OR-gate 382 which also receives a further input from another source which may be a manual inhibit signal. The output of OR-gate 382 is then applied to blocks 390 and 398 in order to inhibit the output data.

The remainder of the system as shown in FIG. 11 includes descramblers 384 and 392 for channels A and B which receive the respective scrambled data and clock signals for the channels. The scramblers are matched to the scramble codes in the transmitter portion of the system. Test mode detectors 386 and 394 are connected to each scrambler unit and provide visual outputs at indicators 388 and 396 when the system is in the test mode as described above. The output of the descramblers are applied to NRZ to bipolar format converters 390 and 398 which also receive the respective clock signals for the channels. The output of blocks 390 and 398 are the initial channel A and channel B PCM data.

Although the best mode for practicing the invention has been disclosed herein, it will be apparent to those of ordinary skill in the art that the embodiments disclosed may be modified without departing from the scope of the invention. The invention is thus to be limited only by the scope of the appended claims.

We claim:

1. In a communications system transmitting two independently timed binary data signals on a single quadriphase modulated carrier through a transmission medium, the combination comprising
    A. means receiving said two independently timed binary data signals for continuously uniquely identifying at least one of said signals, said means preserving the independent timing of said signals,
    B. means receiving said independently timed data signals from said last recited means for generating a quadriphase modulated carrier signal in accordance with said signals, and
    C. means for applying said quadriphase modulated carrier signal to said transmission medium.

2. The combination of claim 1 further comprising
    A. means receiving said quadriphase modulated carrier signal from said transmission medium for quadriphase demodulating said carrier signal to provide first and second demodulated signals,
    B. means receiving said first and second demodulated signals in either of two senses for removing said unique identification from at least one of said signals to provide third and fourth signals corresponding to said independently timed binary data signals when said first and second signals are applied in the correct sense, and
    C. means receiving said first and second demodulated signals for recognizing said unique identification to control the sense in which said first and second demodulated signals are applied to said removing means.

3. Apparatus according to claim 1 wherein said means for continuously uniquely identifying at least one of said signals comprises means for changing the data rate of one of said signals.

4. Apparatus according to claim 2 wherein said means for continuously uniquely identifying at least one of said signals comprises means for changing the data rate of one of said signals.

5. The combination of claim 4 wherein said removing means comprises means for returning the data rate of said one of said signals to its original data rate.

6. The combination of claim 5 wherein said means for recognizing said unique identification comprises means for comparing the data rate of one of said demodulated signals to a reference clock rate signal.

7. The combination of claim 6 wherein said means for continuously uniquely identifying increases the data rate of said one of said signals.

8. The combination of claim 7 wherein said means for continuously uniquely identifying includes means for periodically inserting a stuff bit in the increased rate data stream of said one of said signals.

9. The combination of claim 8 wherein said removing means includes means for detecting and removing said stuff bit in said one of said signals.

10. The combination of claim 9 further comprising error detecting means monitoring the detection of said stuff bit.

11. The combination of claim 1 further comprising processing means preceding said means for uniquely identifying, said processing means comprising means for scrambling each of said signals with distinct scrambling codes, said scrambling codes being independently timed.

12. The combination of claim 2 further comprising
    input processing means preceding said means for uniquely identifying for scrambling each of said signals with distinct scrambling codes, said scrambling codes being independently timed, and
    output processing means subsequent to said removing means for descrambling said signals, said output processing means having descrambling codes corresponding to said distinct scrambling codes of said input processing means.

13. A method of transmitting two independently timed binary data signals on a single quadriphase modulated carrier through a transmission medium comprising
    processing said signals to continuously uniquely identify at least one of said signals, while preserving the independent timing of said signals,
    generating a quadriphase modulated carrier signal in accordance with said uniquely identified independently timed signals, and
    applying said quadriphase modulated carrier signal to said transmission medium.

14. The method of claim 13 further comprising
    receiving said quadriphase modulated carrier signal from said transmission medium,
    quadriphase demodulating said quadriphase modulated carrier signal to provide a pair of demodulated signals,
    processing said demodulated signals in either of two senses to provide said binary data signals when said unique identification is removed from said pair of demodulated signals in the correct sense, and
    monitoring said demodulated signals to detect said non-random characteristic, and reversing the sense of said pair of demodulated signals when said characteristic is not recognized.

15. The method of claim 13 wherein said step of processing includes the step of changing the data rate of one of said signals.

16. The method of claim 14 wherein said step of processing said signals to continuously identify at least one of said signals includes the step of changing the data rate of one of said signals.

* * * * *